United States Patent
Liu et al.

(10) Patent No.: US 12,254,243 B1
(45) Date of Patent: Mar. 18, 2025

(54) AUDIO PLAYBACK METHOD AND APPARATUS, ELECTRONIC DEVICE AND STORAGE MEDIUM

(71) Applicant: Linkplay Technology Inc., Newark, CA (US)

(72) Inventors: Ning Liu, Newark, CA (US); Qi Wang, Newark, CA (US); Lifeng Zhao, Newark, CA (US)

(73) Assignee: Linkplay Technology Inc., Newark, CA (US)

( * ) Notice: Subject to any disclaimer, the term of this patent is extended or adjusted under 35 U.S.C. 154(b) by 0 days.

(21) Appl. No.: 18/815,378

(22) Filed: Aug. 26, 2024

(51) Int. Cl.
*G10L 15/22* (2006.01)
*G06F 3/16* (2006.01)

(52) U.S. Cl.
CPC .............. *G06F 3/165* (2013.01); *G10L 15/22* (2013.01)

(58) Field of Classification Search
CPC ....... G06F 3/0482; G06F 3/165; G08C 25/02; G10L 15/22; G11B 27/105; H04L 12/282; H04L 67/10; H04N 21/43615; H04N 21/4363; H04N 21/44209; H04N 21/8113
See application file for complete search history.

(56) References Cited

U.S. PATENT DOCUMENTS

| | | | | |
|---|---|---|---|---|
| 11,789,690 B2* | 10/2023 | Bulis | ................ | H04N 21/43615 700/94 |
| 2009/0228126 A1* | 9/2009 | Spielberg | ................ | H04L 67/10 715/728 |
| 2015/0018992 A1* | 1/2015 | Griffiths | ............... | G11B 27/105 700/94 |
| 2016/0110156 A1* | 4/2016 | Kusano | ............ | H04N 21/44209 700/94 |

(Continued)

FOREIGN PATENT DOCUMENTS

| CN | 101167127 A | 4/2008 |
|---|---|---|
| CN | 112333533 A | 2/2021 |

(Continued)

OTHER PUBLICATIONS

First Office Action issued in counterpart Chinese Patent Application No. 202410631959.9, dated Jun. 28, 2024.

(Continued)

*Primary Examiner* — Gerald Gauthier
(74) *Attorney, Agent, or Firm* — Westbridge IP LLC

(57) ABSTRACT

An audio playback method includes: performing, in a parallel manner, digital audio signal encoding on original audio data to be played back, to obtain a plurality of pieces of target encoded audio data; performing encapsulation on the plurality of pieces of target encoded audio data to obtain a plurality of target audio frames, and synchronizing the plurality of target audio frames to all communication-capable audio playback devices; in response to a switching (Continued)

command for switching an audio playback device, determining at least one candidate audio playback device indicated by the switching command; where the switching command is used to indicate an audio switching position; performing optimal playback device recognition on the at least one candidate audio playback device, to obtain a target audio playback device; and sending an audio switching playback command to the target audio playback device.

10 Claims, 4 Drawing Sheets

(56) References Cited

U.S. PATENT DOCUMENTS

| | | | |
|---|---|---|---|
| 2020/0374820 A1 | 11/2020 | Srivastava et al. | |
| 2023/0126124 A1* | 4/2023 | Wilberding | G06F 3/165 700/94 |
| 2023/0144696 A1* | 5/2023 | Torgerson | H04L 12/282 381/80 |
| 2023/0161549 A1* | 5/2023 | Gossain | G06F 3/165 700/94 |
| 2023/0161551 A1* | 5/2023 | Lang | G06F 3/165 700/94 |
| 2023/0199043 A1* | 6/2023 | Corbin | H04L 67/10 700/94 |
| 2023/0209100 A1* | 6/2023 | Coburn, IV | H04N 21/4363 700/94 |
| 2023/0245682 A1* | 8/2023 | Sanders | G08C 25/02 455/522 |
| 2023/0315194 A1* | 10/2023 | D'Amato | H04N 21/8113 700/94 |
| 2023/0315381 A1* | 10/2023 | Reimann | G06F 3/0482 700/94 |

FOREIGN PATENT DOCUMENTS

| | | |
|---|---|---|
| CN | 113296728 A | 8/2021 |
| CN | 114257324 A | 3/2022 |
| CN | 115243236 A | 10/2022 |
| CN | 117692444 A | 3/2024 |
| WO | 2022033176 A1 | 2/2022 |
| WO | 2022100414 A1 | 5/2022 |
| WO | 2023207807 A1 | 11/2023 |

OTHER PUBLICATIONS

Notification to Grant Patent Right for Invention issued in counterpart Chinese Patent Application No. 202410631959.9, dated Jul. 23, 2024.

Second Office Action issued in counterpart Chinese Patent Application No. 202410631959.9, dated Jul. 11, 2024.

* cited by examiner

AUDIO PLAYBACK METHOD AND APPARATUS, ELECTRONIC DEVICE AND STORAGE MEDIUM

CROSS-REFERENCE TO RELATED APPLICATIONS

The present application claims priority to Chinese Patent Application No. 202410631959.9, filed in China on May 21, 2024, which is incorporated herein by reference in its entirety.

TECHNICAL FIELD

The present disclosure relates to the field of audio processing technologies, and in particular, to an audio playback method and an audio playback apparatus, an electronic device and a storage medium.

BACKGROUND

In a multi-playback device system, scenarios involving the switching of audio playback devices may occur. For example, a control module of a smart home system may switch audio playback from a mobile phone to a television or a bedroom speaker.

The existing technology for switching audio playback devices usually starts encoding and playing the audio data after the switched audio playback device receives a command. This method has the technical issue of excessive delay during playback switching.

SUMMARY

In view of this, an objective of the present disclosure is to provide an audio playback method and an audio playback apparatus, an electronic device and a storage medium, so as to reduce playback delay when switching audio playback devices.

In a first aspect, the present disclosure provides an audio playback method, including:
  performing, in a parallel manner, digital audio signal encoding on original audio data to be played back, to obtain a plurality of pieces of target encoded audio data;
  performing encapsulation on the plurality of pieces of target encoded audio data to obtain a plurality of target audio frames, and synchronizing the plurality of target audio frames to all communication-capable audio playback devices;
  in response to a switching command for switching an audio playback device, determining at least one candidate audio playback device indicated by the switching command; where the switching command is used to indicate an audio switching position;
  performing optimal playback device recognition on the at least one candidate audio playback device, to obtain a target audio playback device; and
  sending an audio switching playback command to the target audio playback device, to enable the target audio playback device to start audio playback based on the target encoded audio data from the audio switching position.

In a second aspect, the present disclosure provides an audio playback method, applied to an audio playback device, the method including:
  in response to an audio switching playback command, determining a first audio segment and a second audio segment based on an audio switching position indicated by the audio switching playback command; where the first audio segment includes a plurality of audio frames within a preset duration before the audio switching position, and the second audio segment includes a plurality of audio frames within the preset duration after the audio switching position;
  performing crossfading on the second audio segment according to a playback parameter of the first audio segment in the original audio playback device to obtain a target audio segment; and playing the target audio segment.

In a third aspect, the present disclosure provides an audio playback apparatus, including:
  an encoding module, configured to perform, in a parallel manner, digital audio signal encoding on original audio data to be played back, to obtain a plurality of pieces of target encoded audio data;
  a synchronization module, configured to perform encapsulation on the plurality of pieces of target encoded audio data to obtain a plurality of target audio frames, and synchronizing the plurality of target audio frames to all communication-capable audio playback devices;
  a preliminary selection module, configured to, in response to a switching command for switching an audio playback device, determine at least one candidate audio playback device indicated by the switching command; where the switching command is used to indicate an audio switching position;
  an optimal selection module, configured to perform optimal playback device recognition on the at least one candidate audio playback device, to obtain a target audio playback device; and
  an indication module, configured to send an audio switching playback command to the target audio playback device, to enable the target audio playback device to start audio playback based on the target encoded audio data from the audio switching position.

In a fourth aspect, the present disclosure provides an audio playback apparatus, applied to an audio playback device, the apparatus including:
  a response module, configured to, in response to an audio switching playback command, determine a first audio segment and a second audio segment based on an audio switching position indicated by the audio switching playback command; where the first audio segment includes a plurality of audio frames within a preset duration before the audio switching position, and the second audio segment includes a plurality of audio frames within the preset duration after the audio switching position;
  a crossfading module, configured to perform crossfading on the second audio segment according to a playback parameter of the first audio segment in the original audio playback device to obtain a target audio segment; and
  a playback module, configured to play the target audio segment.

In a fifth aspect, the present disclosure provides an electronic device, including: a processor and a memory; where the memory has stored thereon instructions executable by the processor, and the instructions, when executed by the processor, cause the processor to perform the above-mentioned audio playback method.

In a sixth aspect, the present disclosure provides a computer-readable storage medium, the computer-readable storage medium stores computer-executable instructions, which, when called and executed by a processor, cause the processor to implement the above-mentioned audio playback method.

The embodiments of the present disclosure bring the following beneficial effects.

In the audio playback method, the audio playback apparatus, the electronic device and the storage medium, the audio to be played is encoded in advance in a parallel manner, and audio frames after encapsulation are synchronized to all communication-capable audio playback devices. When a switching command is triggered, after determining the optimal target audio playback device to be switched to, an audio switching playback command is sent to the target audio playback device, causing the target audio playback device to play the pre-received audio frames. This achieves a seamless effect when switching audio playback devices and reduces playback delay during the switching.

Other features and advantages of the present disclosure will be set forth in the following description, and in part will become apparent from the description, or may be learned by carrying out the present disclosure. The objectives and other advantages of the present disclosure will be realized and obtained from the description, claims, and the structure particularly pointed out in the accompanying drawings.

To make the above objectives, features, and advantages of the present disclosure more comprehensible, preferred embodiments are listed below with detailed descriptions in conjunction with the accompanying drawings.

BRIEF DESCRIPTION OF THE DRAWINGS

In order to illustrate the technical solutions of the embodiments of the present disclosure or the prior art in a clearer manner, the drawings required for the description of the embodiments of the present disclosure or the prior art will be described hereinafter briefly. Apparently, the following drawings merely relate to some embodiments of the present disclosure, and based on these drawings, a person of ordinary skill in the art may obtain other drawings without any creative effort.

DETAILED DESCRIPTION OF THE EMBODIMENTS

In order to make the objectives, the technical solutions and the advantages of the present disclosure more apparent, the technical solutions of the present disclosure will be described hereinafter in a clear and complete manner in conjunction with the drawings. Apparently, the following embodiments merely relate to a part of, rather than all of, the embodiments of the present disclosure, and based on these embodiments, a person skilled in the art may, without any creative effort, obtain the other embodiments, which also fall within the scope of the present disclosure.

Terms such as "first", "second", "third" and "fourth" (if they appear) in the description, claims and drawings of the present disclosure are used to differentiate similar objects, and not necessarily used to describe a specific sequence or order. It should be appreciated that the data used in this way may be interchanged under an appropriate circumstance, so that the embodiment of the present disclosure described herein, for example, may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device.

Figure 1:
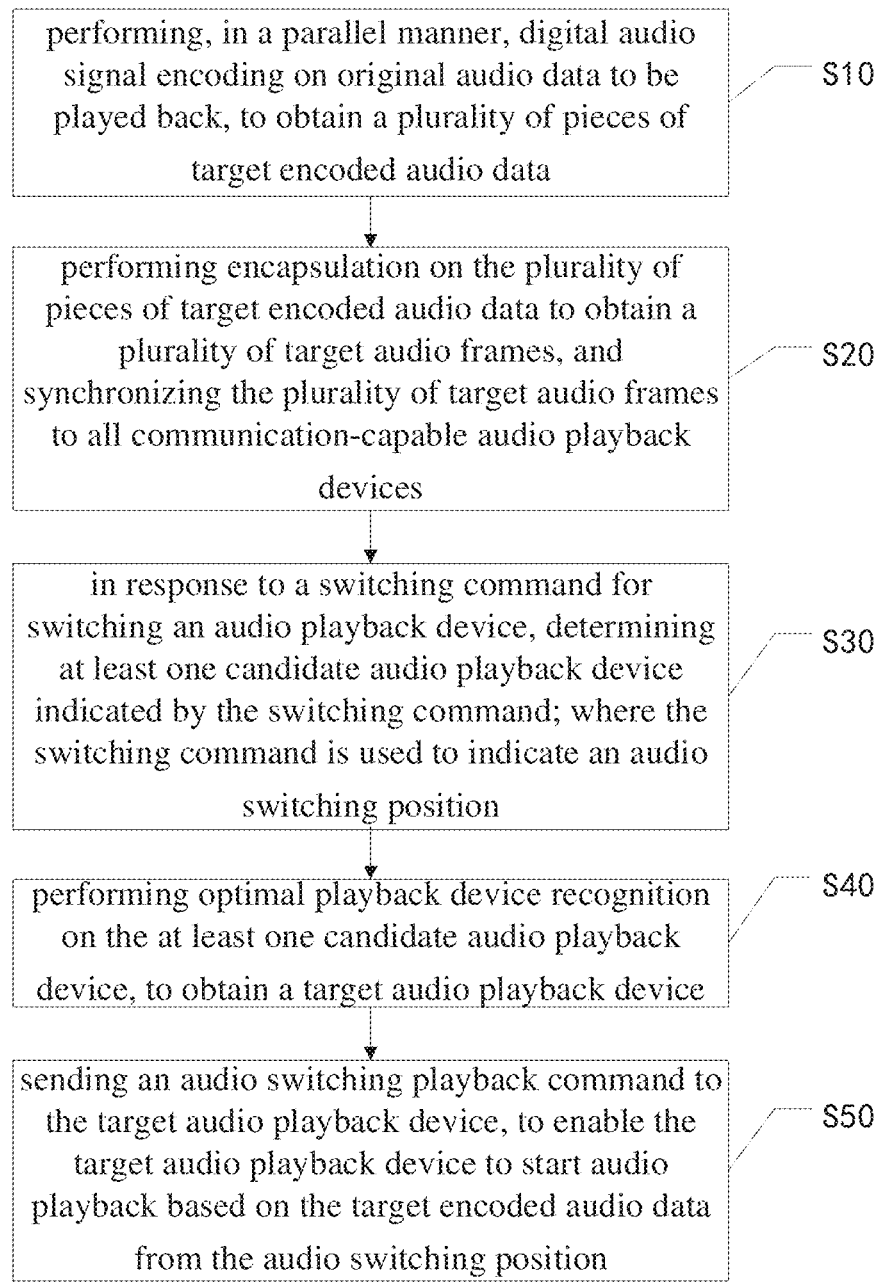
FIG. 1 is a flowchart illustrating one embodiment of an audio playback method according to the embodiments of the present disclosure.

For ease of understanding, the specific flow of the embodiments of the present disclosure is described below. Referring to FIG. 1, one embodiment of the audio playback method according to the present disclosure includes the following steps.

Step S10, performing, in a parallel manner, digital audio signal encoding on original audio data to be played back, to obtain a plurality of pieces of target encoded audio data.

In this embodiment, the original audio data to be played is an analog audio signal in digital form. Through performing the digital audio signal encoding in a parallel manner, it is able to efficiently obtain audio data in an encoded format, i.e., target encoded audio data. As can be appreciated, the analog audio signal refers to a physical quantity that continuously varies over time, while a digital audio signal is discrete. In one embodiment, through a preset digital audio signal encoding algorithm, digital audio signal encoding is performed on the original audio data to be played in a parallel manner, to obtain a plurality of pieces of target encoded audio data. Specifically, the preset digital audio signal encoding algorithm may be a pulse code modulation (PCM) algorithm, a pulse density modulation (PDM) algorithm, or any other algorithm capable of converting an analog audio signal into a digital audio signal, which will not be particularly defined herein.

It should be noted that the original audio data to be played may be part or all of a target audio object. In other words, the original audio data to be played may be a segment of an analog audio signal of the target audio object or an entire analog audio signal of the target audio object. For example, in a case where a song is to be played, the song is the target audio object. The original audio data to be played may be a part of an analog audio signal of the song (i.e., a segment of the analog audio signal) or a complete and entire analog audio signal of the song, which will not be particularly defined herein.

Furthermore, the target audio object may be an audio object currently being played by an original audio playback device or any specified audio object. The specified audio object may be an audio object that is not being played by any audio playback device. For example, the target audio object may be music currently playing on Speaker A, music selected on a phone or streaming media box, or audio from a program currently playing on a television, which is not particularly defined herein. It should be noted that the original audio playback device may be any device with an audio playback function other than the target audio playback device, which is not particularly defined herein.

In this embodiment, to improve the smoothness of audio playback switching and reduce playback delay, digital audio signal encoding is performed on the original audio data to be played in the parallel manner, so as to obtain multiple pieces of target encoded audio data. In one embodiment, the original audio data to be played may be divided according to a preset parallel quantity into at least the preset parallel quantity of portions, so as to obtain multiple portions of original audio data. Next, digital audio signal encoding is performed on the portions of the original audio data simultaneously at least once, to obtain multiple pieces of target encoded audio data. The preset parallel quantity is used to indicate a quantity of portions of original audio data on which digital audio signal encoding is performed simultaneously each time. For example, in a case where the preset parallel quantity is 5, the original audio data to be played may be divided into a multiple of 5, e.g., 10, portions, 2 rounds of parallel digital audio signal encoding are required, with each round encoding 5 portions of original audio data simultaneously, thereby to obtain 10 pieces of target encoded audio data. It should be appreciated that, the larger the preset parallel quantity or the smaller the data size per encoding session, the higher the efficiency of the encoding process, resulting in smoother audio playback switching and lower playback delay.

In one embodiment, when performing digital audio signal encoding in the parallel manner, the original audio data to be played may be sampled in the parallel manner, to obtain multiple target sample values. Next, the target sample values are converted into digital audio signals, to obtain the plurality of pieces of target encoded audio data, where each piece of target encoded audio data corresponds to one target sample value. In one embodiment, a parallel processing manner may be adopted at any step during the digital audio signal encoding process. For example, in a case where digital audio signal encoding is performed through the PCM algorithm, a parallel processing manner may be adopted at any step of the PCM algorithm, such as parallel sampling, parallel quantization, parallel conversion, and/or parallel reconstruction, which will not be particularly defined herein.

Step S20, performing encapsulation on the plurality of pieces of target encoded audio data to obtain a plurality of target audio frames, and synchronizing the plurality of target audio frames to all communication-capable audio playback devices.

In this embodiment, to facilitate playback by audio playback devices, encapsulation is performed on the plurality of pieces of target encoded audio data in advance to obtain the target encoded audio data in an audio frame form, so as to obtain a plurality of target audio frames. Next, the plurality of target audio frames is synchronized to all communication-capable audio playback devices. This enables the switched target audio playback device, during the audio playback devices switching, to quickly obtain the playable target audio frames locally, thereby achieving fast audio playback and reducing the delay associated with switching audio playback devices. In one embodiment, in a case where one piece of target encoded audio data corresponds to one target sample value, one target audio frame may include multiple pieces of target encoded audio data. For example, 480 target sample values may be packaged into one target audio frame. In a case where 100 frames are synchronized per second to a communication-capable audio playback device, 48,000 target sample values may be synchronized per second to the communication-capable audio playback device, which will not be particularly defined herein.

In one embodiment, synchronization-related information may also be encapsulated in the form of header information within the target audio frame. The synchronization-related information is used to indicate synchronized audio playback, and may include frame numbers and time information (such as timestamps, sample position times, etc.), which will not be particularly defined herein. As can be appreciated, the audio frame is a form of organizing and packaging audio data, which makes it convenient to be transmitted among different devices. When the encoded audio data is packaged into audio frames, it is able to be transmitted over a network or stored on storage devices, thereby facilitating subsequent decoding and playback. In addition, the audio frame further includes metadata information such as sample rate, bit depth and the quantity of channels. The metadata information is crucial for decoding and playback. When the audio data is packaged into audio frames, it is able to add the key metadata information into the data, thereby ensuring that a decoding end can correctly understand and process the audio data. The audio frame further includes timestamps or other synchronization information, so as to ensure that audio data can be decoded and outputted in the correct order and timing during playback. This is crucial for real-time communication or multimedia applications, thereby ensuring synchronized playback of audio and video.

As can be appreciated, a communication-capable audio playback device refers to an audio playback device that is in a communication-capable state. For example, in a case where the embodiments of the present application are applied to a server, the communicable audio playback device refers to an audio playback device that can communicate with the server. In a case where the embodiments of the present application are applied to a streaming media box, the communicable audio playback device may refer to an audio playback device within a same local area network as the streaming media box. It may also refer to an audio playback device capable of communicating with the same server, or an audio playback device that can communicate with the streaming media box through any communication manner (e.g., Bluetooth). It should be noted that the server may act as an entity of performing the embodiments of the present application or as a data relay carrier in the embodiments of the present application, which will not be particularly defined herein.

Step S30, in response to a switching command for switching an audio playback device, determining at least one candidate audio playback device indicated by the switching command; where the switching command is used to indicate an audio switching position.

As can be appreciated, a user may trigger a switching command for switching an audio playback device in any form. In response to the switching command for switching the audio playback device, at least one candidate audio playback device is determined based on the switching command. For example, the user may send a voice command "switch the music to the room" to any communication-capable audio playback device or audio control device. The user may also use a remote control or a mobile phone to switch the audio playback device, or trigger a switching command through a control on the audio playback device to switch the audio playback device, which is not particularly defined herein.

It should be noted that the candidate audio playback device is any one of the communication-capable audio playback devices. The switching command may explicitly specify one audio playback device to switch to, or it may specify a range/condition of the audio playback device to be switched to. When the switching command explicitly specifies one audio playback device, the one audio playback device is the target audio playback device. When the switching command specifies the range/condition of the audio playback device to be switched to, at least one candidate audio playback device is the communication-capable audio playback device that meets the range/condition of the audio playback device to be switched to. For example, when the user switches, through a control on any one communication-capable audio playback device, the audio to play on this device, the communication-capable audio playback device is the target audio playback device. When the user gives a voice command "switching the music to the room", all communication-capable audio playback devices in the room meet this voice command. In this regard, all communication-capable audio playback devices in the room, which may include a speaker, a TV, a headphone, a computer, etc., are considered as candidate audio playback devices.

Step S40, performing optimal playback device recognition on the at least one candidate audio playback device, to obtain a target audio playback device.

In this embodiment, the target audio playback device is an optimal audio playback device among all candidate audio playback devices. For example, the target audio playback device may be an audio playback device with the fastest network transmission speed, the highest user preference, or the best performance among all the candidate audio playback devices. In one embodiment, through a preset playback suitability scoring strategy, playback suitability scoring is performed on the at least one candidate audio playback device, to obtain scoring results. Next, the target audio playback device is determined according to the scoring results.

In one embodiment of the present disclosure, there is one or more target audio playback devices, which is not particularly defined herein. For example, through the preset playback suitability scoring strategy, three candidate audio playback devices having a same highest suitability score are obtained, and all three candidate audio playback devices are determined target audio playback devices, which is not particularly defined herein.

Step S50, sending an audio switching playback command to the target audio playback device, to enable the target audio playback device to start audio playback based on the target encoded audio data from the audio switching position.

In this embodiment, after determining the target audio playback device, an audio switching playback command is sent to the target audio playback device. The target audio playback device, in response to the audio switching playback command, starts audio playback based on the target encoded audio data from the audio switching position. For example, in practical applications, an intelligent voice interaction system may be installed in a user's house, and an audio playback device is arranged in each room. The user may trigger a switching command for switching the audio playback device via a control module of the intelligent voice interaction system to seamlessly switch the currently playing target audio object from audio playback device A to audio playback device B. The control module may be set up or installed on any device of the intelligent voice interaction system, such as a user's mobile phone, a streaming media box, and/or any audio playback device, which is not particularly defined herein.

In the audio playback method, the audio to be played is encoded in advance in a parallel manner, and audio frames after encapsulation are synchronized to all communication-capable audio playback devices. When a switching command is triggered, after determining the optimal target audio playback device to be switched to, an audio switching playback command is sent to the target audio playback device, causing the target audio playback device to play the pre-received audio frames. This achieves a seamless effect when switching audio playback devices and reduces playback delay during the switching.

Figure 2:
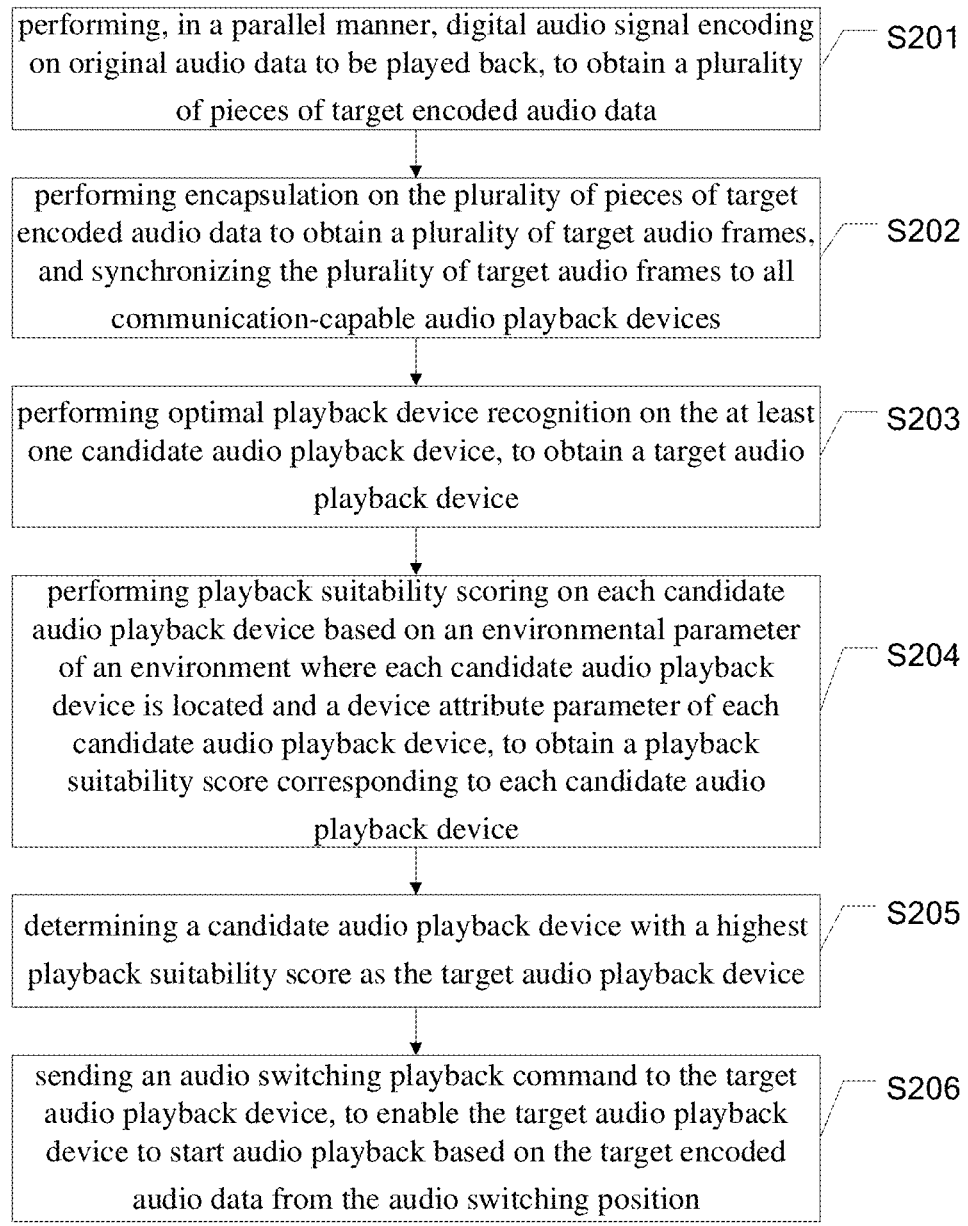
FIG. 2 is a flowchart illustrating another embodiment of the audio playback method according to the embodiments of the present disclosure.

Please refer to FIG. 2, which is a flowchart illustrating another embodiment of the audio playback method according to the embodiments of the present disclosure and includes following steps.

Step S201, performing, in a parallel manner, digital audio signal encoding on original audio data to be played back, to obtain a plurality of pieces of target encoded audio data.

In one embodiment of the present disclosure, Step S201 includes: obtaining the original audio data to be played in real time; where the original audio data is a segment of an audio object currently being played on an original audio playback device; performing floating-point sample sampling on the original audio data to obtain a plurality of pieces of floating-point sample audio data; performing digital audio signal encoding on the plurality of pieces of floating-point sample audio data in the parallel manner to obtain the plurality of pieces of target encoded audio data.

It should be noted that the original audio playback device refers to an audio playback device that is playing the target audio object before the switching. In this embodiment, a segment-based encoding technology is used to encode the target audio object in a segmented manner. Specifically, the original audio data to be played is a segment of the target audio object to be played, and the segment to be played is a part of the target audio object and has a same format as the original audio data. For example, it is assumed that the original audio playback device playing music A before switching the audio playback device is audio playback device 01. In this case, music A is the target audio object. In a case where music A is divided into 100 segments, and the currently playing segment is an 80th segment, an 81st segment is a segment of music A to be played, which is the original audio data to be played.

In this embodiment, when analog audio signals that continuously vary over time are converted into discrete digital audio signals, it is able to effectively improve the audio playback quality through floating-point sample sampling, thereby ensuring that the audio quality remains high even after switching the audio playback device. It should be noted that floating-point sample audio data refers to an analog audio signal represented by floating-point numbers. In one embodiment, the original audio data may first be converted into floating-point numbers to obtain floating-point audio data. Next, the floating-point audio data is sampled according to a preset sampling rate to obtain multiple pieces of floating-point sample audio data. For example, it is assumed that the original audio data is in 16-bit integer format with a limited quantization range, and it is difficult to meet high-fidelity audio requirements. In contrast, for floating-point numbers, the IEEE-754 binary floating-point arithmetic standard may be used, so as to improve audio quality.

In this embodiment, after obtaining the plurality of pieces of floating-point sample audio data, the floating-point sample audio data is converted in the parallel manner into digital audio signals, so as to obtain the plurality of pieces of target encoded audio data. Specifically, in one embodiment, quantization and coding are performed on the plurality of pieces of floating-point sample audio data in the parallel manner, so as to obtain the plurality of pieces of target encoded audio data. Thus, it is able to improve audio encoding efficiency through parallel encoding, allowing all communication-capable audio playback devices to receive the audio segments to be played more efficiently, thereby reducing playback delay when switching audio playback devices.

In one embodiment of the present disclosure, performing floating-point sample sampling on the original audio data to obtain the plurality of pieces of floating-point sample audio data includes: sampling the original audio data at a preset sampling rate to obtain a plurality of pieces of integer sample audio data; converting the plurality of pieces of integer sample audio data into floating-point numbers, to obtain a plurality of pieces of first sample audio data; normalizing the plurality of pieces of first sample audio data to obtain the plurality of pieces of floating-point sample audio data.

In this embodiment, the original audio data is sampled according to a preset sampling rate to obtain multiple pieces of integer sample audio data. Next, multiple pieces of integer sample audio data are converted into floating-point numbers, to obtain a plurality of pieces of first sample audio data corresponding to multiple pieces of integer sample audio data respectively, where the first sample audio data is a floating-point number. For example, it is assumed that the integer sample audio data is a 16-bit integer value. After conversion to a floating-point number, the resulting first sample audio data may be a 32-bit floating-point number, which is not particularly defined herein. In one embodiment, multiple pieces of integer sample audio data may be converted to floating-point numbers through table lookup or fixed-point to floating-point conversion instructions, e.g., Intel's CVT instruction. Next, the multiple pieces of first sample audio data are normalized to an interval of [−1, 1], so as to obtain multiple pieces of floating-point sample audio data, thereby facilitating subsequent operations.

In one embodiment of the present disclosure, performing digital audio signal encoding on the plurality of pieces of floating-point sample audio data in the parallel manner to obtain the plurality of pieces of target encoded audio data includes: performing, by using a single instruction multiple data (SIMD) algorithm, audio characteristic parameter extraction in the parallel manner on a preset parallel quantity of pieces of floating-point sample audio data to obtain a plurality of audio characteristic parameters; performing quantization and coding on, and removing redundant information from, the plurality of audio characteristic parameters to obtain the plurality of pieces of target encoded audio data. In this embodiment, the SIMD instruction is used to simultaneously perform digital audio signal encoding on the preset parallel quantity pieces of floating-point sample audio data, so as to obtain the plurality of pieces of target encoded audio data. In specific, though the SIMD instruction, audio characteristic parameter extraction is performed in the parallel manner on a preset parallel quantity of pieces of floating-point sample audio data to obtain a plurality of audio characteristic parameters. Next, quantization and coding is performed on the plurality of audio characteristic parameters, and redundant information is removed from the plurality of audio characteristic parameters, so as to obtain the plurality of pieces of target encoded audio data. For example, when transformation domain analysis is performed on multiple pieces of floating-point sample audio data, it is able to extract audio characteristic parameters, where the audio characteristic parameters may be Linear Prediction Coefficients (LPC) and Mel-Frequency Cepstral Coefficients (MFCC), etc. The audio characteristic parameters may be used for subsequent signal representation and reconstruction. Next, quantization and coding is performed on the audio characteristic parameters, and redundant information is removed, so as to obtain a compressed audio data rate (i.e., multiple pieces of target encoded audio data). Quantization and coding may be performed by using such an encoding algorithm as Vector Quantization (VQ) or Algebraic Codebook Excited Linear Prediction (ACELP), so as to balance the data rate and distortion.

Step S202, performing encapsulation on the plurality of pieces of target encoded audio data to obtain a plurality of target audio frames, and synchronizing the plurality of target audio frames to all communication-capable audio playback devices.

In one embodiment of the present disclosure, Step S202 includes: obtaining sampling information of each target encoded audio data, encapsulating the preset quantity of pieces of target encoded audio data and the corresponding sampling information into one audio frame, to obtain the plurality of target audio frames; synchronizing the plurality of target audio frames to all communication-capable audio playback devices via a local area network. In this embodiment, relevant sampling data of sampling each target encoded audio data is encapsulated into the audio frame, so as to obtain multiple target audio frames. Each audio frame includes a preset quantity of pieces of target encoded audio data and the sampling information corresponding to each target encoded audio data, where the sampling information may include frame numbers, sampling timestamps, synchronization information, etc., which will not be particularly defined herein. Next, the multiple target audio frames are distributed to all communication-capable audio playback devices in UDP (User Datagram Protocol) packets manner via a local area network (LAN). The communication-capable audio playback devices store the received multiple target audio frames in a buffer, so that they can play the multiple target audio frames upon receiving the switching command for switching the audio playback device.

Step S203, performing optimal playback device recognition on the at least one candidate audio playback device, to obtain a target audio playback device.

In one embodiment of the present disclosure, Step S203 includes: determining whether the switching command is a voice-type switching command in response to the switching command for switching the audio playback device; performing semantic recognition on a voice content of the switching command in response to that the switching command is the voice-type switching command, to obtain the at least one candidate audio playback device indicated by the switching command; parsing the switching command for information about the audio playback device in response to that the switching command is a non-voice-type switching command, to obtain the at least one candidate audio playback device indicated by the switching command.

As can be appreciated, a user may trigger a switching command for switching an audio playback device in any form. The switching commands triggered in different forms correspond to different types of commands, including but not limited to a voice command, a software command, a remote control command, and a device control command, which is not particularly defined herein. In this embodiment, in response to the switching command for switching the audio playback device, it is determined whether the switching command is a voice-type switching command. In response to that the switching command is the voice-type switching command, semantic recognition is performed on a voice content of the switching command, so as to obtain the at least one candidate audio playback device. For example, a user can say "switching the music to play in the room" to any device with a control module in the intelligent voice interaction system. Next, semantic recognition is performed on the voice content "switching the music to play in the room", all communication-capable audio playback devices located in the room may be determined as the candidate audio playback devices. In a case where the switching command is of a type other than voice, the switching command is parsed for information about the audio playback device, so as to obtain at least one candidate audio playback device indicated by the switching command. For example, if a user clicks a button "playing in the room" of a control software of the intelligent voice interaction system installed on her/his mobile phone, through parsing the information associated with this button, all communication-capable audio playback devices in the room are determined as candidate audio playback devices.

Step S204, performing playback suitability scoring on each candidate audio playback device based on an environmental parameter of an environment where each candidate audio playback device is located and a device attribute parameter of each candidate audio playback device, to obtain a playback suitability score corresponding to each candidate audio playback device.

In this embodiment, through performing playback suitability scoring, it is able to select the most suitable target audio playback device from all candidate audio playback devices, thereby providing a better audio playback device switching experience. In specific, the playback suitability score corresponding to each candidate audio playback device is calculated according to the environmental parameter of the environment where each candidate audio playback device is located and the device attribute parameter. The environmental parameter may be any parameter related to the sound in the environment, such as an ambient noise level, whether a talker is located in a specific space where any candidate audio playback device is located, and whether the environment where the candidate audio playback device is located is in a silent mode, etc., which is not particularly defined herein. The device attribute parameter of the candidate audio playback device includes a hardware attribute parameter and a user configuration parameter. The hardware attribute parameter may be a signal-to-noise ratio (SNR), an input sensitivity, a conversion rate, channel crosstalk, a common-mode rejection ratio (CMRR), a damping factor, etc. The user configuration parameters may be volume, a silent mode switch, a switching priority, a sound effect mode, and any other user-configurable parameter, which is not particularly defined herein.

In one embodiment of the present disclosure, a preset playback suitability scoring function may be used to evaluate the environmental parameter and the device attribute parameter of each candidate audio playback device, so as to obtain the playback suitability score corresponding to each candidate audio playback device. For example, by way of non-limiting examples, one playback suitability scoring function may be:

$$Score = w_1 * parameter_1 + w_2 * parameter_2 \quad w_1 + w_2 = 1$$

Score represents the playback suitability score of the candidate audio playback device, parameter1 represents the environmental parameter, w1 represents a weight of the environmental parameter, parameter2 represents the device attribute parameter, and w2 represents a weight of the device attribute parameter.

In one embodiment of the present disclosure, the environmental parameter includes ambient noise level, and the device attribute parameter includes predicted network transmission delay duration, a device performance parameter and a device preference parameter. Step S204 includes: evaluating the ambient noise level for each candidate audio playback device by using a predefined ambient noise evaluation model, to obtain the environmental parameter of the environment where each candidate audio playback device is located; obtaining a real-time network transmission parameter for each candidate audio playback device, and predicting, based on the real-time network transmission parameter, the network transmission delay duration for each candidate audio playback device to obtain the predicted network transmission delay duration corresponding to each candidate audio playback device; obtaining the device performance parameter and the device preference parameter for each candidate audio playback device, and calculating, by using a predefined playback suitability scoring function, the playback suitability score for each candidate audio playback device based on the environmental parameter, the predicted network transmission delay duration, the device performance parameter and the device preference parameter, to obtain the playback suitability score corresponding to each candidate audio playback device.

In this embodiment, the ambient noise level for each candidate audio playback device is evaluated by using a predefined ambient noise evaluation model on real-time sound data of the environment where each candidate audio playback device is located, to obtain the environmental parameter of the environment where each candidate audio playback device is located. The real-time sound data may be recorded by the corresponding candidate audio playback device or by another audio recording device located in the same environment, which is not particularly defined herein. For example, it is assumed that a candidate audio playback device is in an environment with high construction noise, the ambient noise level for the candidate audio playback device indicates a high level of environmental noise.

In this embodiment, possible network transmission delay duration, i.e., predicted network transmission delay duration, for each candidate audio playback device may be predicted based on real-time network transmission parameters, assuming each candidate audio playback device serves as the target audio playback device. In addition, the device performance parameter and the device preference parameter are further incorporated into the playback suitability score calculation, thereby enhancing the accuracy of the playback suitability score evaluation. The device performance parameter may be any parameter used to indicate the performance of the candidate audio playback device. The device preference parameter refers to the user's preference for the candidate audio playback device, which may be determined based on, e.g., the quantity of historical specified playbacks.

In one embodiment of the present disclosure, the predefined playback suitability scoring function may be $$Score = w_1 * UserPrefer + w_2 * Delay + w_3 * Noise + w_4 * Capacity \quad w_1 + w_2 + w_3 + w_4 = 1$$

Score represents the playback suitability score of the candidate audio playback device, UserPrefer represents the device preference parameter, w1 represents a weight of the device preference parameter, Delay represents the predicted network transmission delay duration, w2 represents a weight of the predicted network transmission delay duration, Noise represents the ambient noise level, w3 represents a weight of the ambient noise level, Capacity represents the device performance parameter, w4 represents a weight of the device performance parameter.

Step S205, determining a candidate audio playback device with a highest playback suitability score as the target audio playback device.

In one embodiment of the present disclosure, there is one or more target audio playback devices. Candidate audio playback devices whose playback suitability scores are higher than a preset score threshold may be determined as target audio playback devices. Candidate audio playback devices may also be sorted according to the playback suitability scores, and the top N (N is a positive integer) candidate audio playback devices may be determined as target audio playback devices. At least one target audio playback device may also be determined according to the playback suitability scores in other ways, which will not be particularly defined herein.

Step S206, sending an audio switching playback command to the target audio playback device, to enable the target audio playback device to start audio playback based on the target encoded audio data from the audio switching position.

In one embodiment of the present disclosure, subsequent to Step S206, the method further includes: monitoring a playback state of the target audio playback device based on playback information feedback from the target audio playback device to obtain a monitoring result; determining an audio frame synchronization strategy for the target audio playback device based on the monitoring result. In this embodiment, after sending the audio switching playback command to the target audio playback device, a playback state of the target audio playback device is also collected and monitored in real time. Specifically, the playback information fed back by the target audio playback device in real time is received, and the playback state of the target audio playback device is analyzed and monitored in real time according to the playback information, so as to obtain the monitoring result. Next, according to the monitoring result, it is determined whether it requires to adjust the audio frame synchronization strategy for the target audio playback device, and a specific audio frame synchronization strategy to be adjusted. The playback information is used to indicate the playback state of the target audio playback device, and may include playback progress, buffering amount, CPU load, etc., which will not be particularly defined herein. For example, assuming that it is monitored that the CPU load of the target audio playback device is higher than a preset warning value, the target audio playback device may be instructed to adopt an audio frame synchronization strategy with a lower synchronization amount, and the audio frame synchronization strategy may be specifically indicated by the audio switching playback command.

In one embodiment of the present disclosure, determining the audio frame synchronization strategy for the target audio playback device based on the monitoring result includes: sending the audio switching playback command to a sub-optimal playback device when the monitoring result indicate that the target audio playback device is incapable of responding; where the sub-optimal playback device is the candidate audio playback device with a playback suitability score second only to that of the target audio playback device. In this embodiment, if it is monitored that the target audio playback device is incapable of responding, the audio switching playback command is sent to a sub-optimal playback device, so that the sub-optimal playback device performs audio playback based on the current audio switching position in response to the audio switching playback command. The suboptimal playback device refers to a candidate audio playback device whose playback suitability score is second only to that of the target audio playback device, and the current audio switching position refers to a playback position of the target audio object when the audio switching playback command is sent to the sub-optimal playback device.

In the audio playback method of the embodiments, the audio to be played is encoded in advance in a parallel manner, and audio frames after encapsulation are synchronized to all communication-capable audio playback devices. When a switching command is triggered, after determining the optimal target audio playback device to be switched to based on the playback suitability scores, an audio switching playback command is sent to the target audio playback device, causing the target audio playback device to play the pre-received audio frames. This achieves a seamless effect when switching audio playback devices and reduces playback delay during the switching. In addition, it also provides a better user experience through the playback suitability scores.

Figure 3:
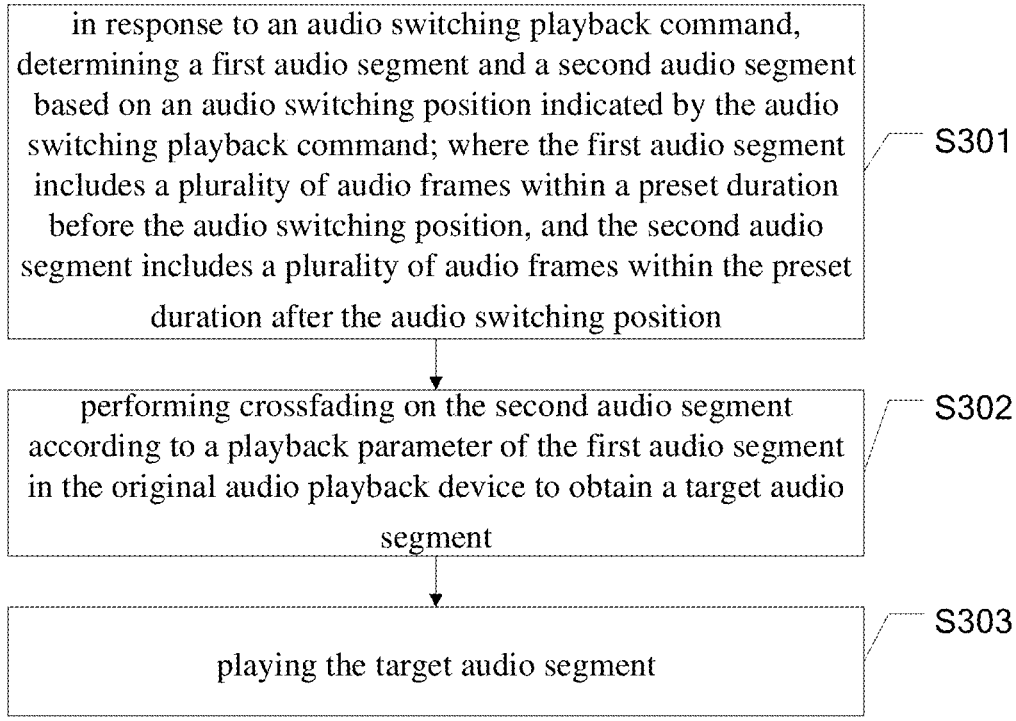
FIG. 3 is a flowchart illustrating yet another embodiment of the audio playback method according to the embodiments of the present disclosure.

Please refer to FIG. 3, which is a flowchart illustrating yet another embodiment of the audio playback method according to the embodiments of the present disclosure. The audio playback method is applied to an audio playback device and includes following steps.

Step S301, in response to an audio switching playback command, determining a first audio segment and a second audio segment based on an audio switching position indicated by the audio switching playback command; where the first audio segment includes a plurality of audio frames within a preset duration before the audio switching position, and the second audio segment includes a plurality of audio frames within the preset duration after the audio switching position.

In this embodiment, upon receiving the audio switching playback command, the audio playback device parses the audio switching playback command to determine the audio switching position, the first audio segment and the second audio segment. The first audio segment includes a plurality of audio frames within a preset duration before the audio switching position, and the second audio segment includes a plurality of audio frames within the preset duration after the audio switching position. For example, in a case where the audio switching point in a song is at 2:05, the first audio segment may include multiple audio frames from 2:04 to 2:05 of the song, and the second audio segment may include multiple audio frames from 2:05 to 2:06 of the song, which will not be particularly defined herein.

Step S302, performing crossfading on the second audio segment according to a playback parameter of the first audio segment in the original audio playback device to obtain a target audio segment.

As can be appreciated, crossfading is an audio signal processing technique used to achieve a smooth transition between two different audio segments, avoiding abrupt changes and discontinuities. A basic theory of crossfading is as follows. Within a transition interval, the volume of a previous segment gradually decreases, and at the same time, the volume of a next segment gradually increases. The audio signals from both segments are superimposed in a specific proportion, resulting in a seamless transition. Specifically, the playback parameter may include a volume parameter, a timbre parameter, a pitch parameter, and the like.

In one embodiment of the present disclosure, Step S302 includes: performing crossfading coefficient calculation, based on the playback parameter of the first audio segment in the original audio playback device, on the plurality of audio frames in the first audio segment and the second audio segment using a fade-in and fade-out window function, to obtain a target crossfading coefficient for each audio frame in the first and second audio segments; performing weighted superimposing on the first audio segment and the second audio segment according to the target crossfading coefficient for each audio frame in the first and second audio segments, to obtain the target audio segment.

In this embodiment, a time window size for crossfading is specified through the fade-in and fade-out window function. For example, any value between 20 milliseconds and 200 milliseconds may be used as the time window size, which may be determined based on such factors as a type of audio and a switching scenario. Next, the audio switching position serves as the center of the time window, and crossfading processing is performed on multiple audio frames within the time window. For example, the audio switching position is at an $N^{th}$ frame and a window size is M frames. A range for crossfade processing may be [N−M/2, N+M/2]. For each frame within the time window, crossfading coefficients a and b are calculated, where a represents a weight of the first audio segment and b represents a weight of the second audio segment, satisfying a+b=1. Starting from a first frame of the time window, a decreases gradually from 1 to 0, while b increases gradually from 0 to 1, where a crossfading curve may be linear, logarithmic, sinusoidal, or the like, which is not particularly defined herein. Weighted superimposing is performed on the first audio segment and the second audio segment according to the target crossfading coefficient, so as to obtain multiple audio frames with smooth transition effect, i.e., the target audio segment. For instance, the first audio segment is x1, the second audio segment is x2, and the target audio segment y is calculated as y=a*x1+b*x2.

Step S303, playing the target audio segment.

In this embodiment, seamless switching between audio playback devices is achieved by playing the target audio segment through the target audio playback device. It should be noted that, after playing the target audio segment, the audio playback device reads multiple audio segments after the target audio segment from the buffer, and plays the multiple audio segments after the target audio segment in order, so as to achieve continuous audio playback. For example, in a case where the audio switching point in a song is at 2:05, the first audio segment may include multiple audio frames from 2:04 to 2:05 of the song, and the second audio segment may include multiple audio frames from 2:05 to 2:06 of the song. After performing crossfading, the obtained target audio segment is multiple audio frames from 2:04 to 2:06 of the song. After these multiple audio frames are played, multiple audio segments after 2:06 of the song are read from the buffer, and then played in order, so that the song is played continuously in the audio playback device. As can be appreciated, each audio segment following the target audio segment includes multiple target audio frames, which may be synchronized to the audio playback device by a sender of the audio switching playback command, allowing the audio playback device to efficiently decode and play the audio.

In the audio playback method of the above embodiments, the audio playback device, in response to the audio switching playback command, performs crossfading playback on the next audio segment according to the playback attributes of the previous audio segment. This ensures smooth volume transition without clipping distortion, effectively smoothing out abrupt changes and differences during audio switching, thereby providing a more natural and coherent auditory experience.

Figure 4:
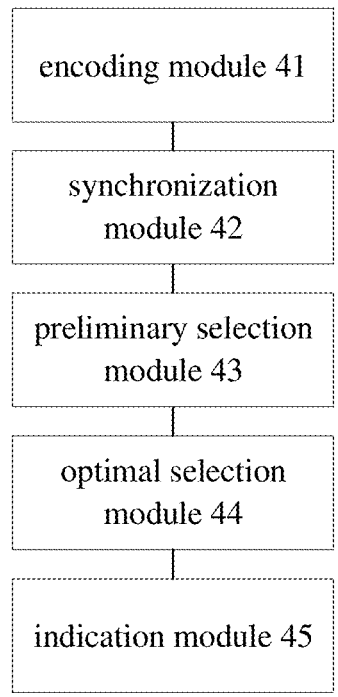
FIG. 4 is a schematic diagram of an audio playback apparatus according to the embodiments of the present disclosure.

Corresponding to the above method embodiments, referring to FIG. 4, which is a schematic diagram of an audio playback apparatus. The audio playback apparatus includes: an encoding module 41, configured to perform, in a parallel manner, digital audio signal encoding on original audio data to be played back, to obtain a plurality of pieces of target encoded audio data; a synchronization module 42, configured to perform encapsulation on the plurality of pieces of target encoded audio data to obtain a plurality of target audio frames, and synchronizing the plurality of target audio frames to all communication-capable audio playback devices; a preliminary selection module 43, configured to, in response to a switching command for switching an audio playback device, determine at least one candidate audio playback device indicated by the switching command; where the switching command is used to indicate an audio switching position; an optimal selection module 44, configured to perform optimal playback device recognition on the at least one candidate audio playback device, to obtain a target audio playback device; and an indication module 45, configured to send an audio switching playback command to the target audio playback device, to enable the target audio playback device to start audio playback based on the target encoded audio data from the audio switching position.

In the audio playback apparatus, the audio to be played is encoded in advance in a parallel manner, and audio frames after encapsulation are synchronized to all communication-capable audio playback devices. When a switching command is triggered, after determining the optimal target audio playback device to be switched to, an audio switching playback command is sent to the target audio playback device, causing the target audio playback device to play the pre-received audio frames. This achieves a seamless effect when switching audio playback devices and reduces playback delay during the switching.

Optionally, the preliminary selection module 43 is specifically configured to: determine whether the switching command is a voice-type switching command in response to the switching command for switching the audio playback device; perform semantic recognition on a voice content of the switching command in response to that the switching command is the voice-type switching command, to obtain the at least one candidate audio playback device indicated by the switching command; parse the switching command for information about the audio playback device in response to that the switching command is a non-voice-type switching command, to obtain the at least one candidate audio playback device indicated by the switching command.

Optionally, the optimal selection module 44 includes: a scoring unit, configured to perform playback suitability scoring on each candidate audio playback device based on an environmental parameter of an environment where each candidate audio playback device is located and a device attribute parameter of each candidate audio playback device, to obtain a playback suitability score corresponding to each candidate audio playback device; an optimal selection unit, configured to determine a candidate audio playback device with a highest playback suitability score as the target audio playback device.

Optionally, the environmental parameter includes ambient noise level, and the device attribute parameter includes predicted network transmission delay duration, a device performance parameter and a device preference parameter;

the scoring unit is specifically configured to evaluate the ambient noise level for each candidate audio playback device by using a predefined ambient noise evaluation model, to obtain the environmental parameter of the environment where each candidate audio playback device is located; obtain a real-time network transmission parameter for each candidate audio playback device, and predict, based on the real-time network transmission parameter, the network transmission delay duration for each candidate audio playback device to obtain the predicted network transmission delay duration corresponding to each candidate audio playback device; and obtain the device performance parameter and the device preference parameter for each candidate audio playback device, and calculate, by using a predefined playback suitability scoring function, the playback suitability score for each candidate audio playback device based on the environmental parameter, the predicted network transmission delay duration, the device performance parameter and the device preference parameter, to obtain the playback suitability score corresponding to each candidate audio playback device.

Optionally, the encoding module 41 includes: an obtaining unit, configured to obtain the original audio data to be played in real time; where the original audio data is a segment of an audio object currently being played on an original audio playback device; a sampling unit, configured to perform floating-point sample sampling on the original audio data to obtain a plurality of pieces of floating-point sample audio data; and an encoding unit, configured to perform digital audio signal encoding on the plurality of pieces of floating-point sample audio data in the parallel manner to obtain the plurality of pieces of target encoded audio data.

Optionally, the sampling unit is specifically configured to sample the original audio data at a preset sampling rate to obtain a plurality of pieces of integer sample audio data; convert the plurality of pieces of integer sample audio data into floating-point numbers, to obtain a plurality of pieces of first sample audio data; and normalize the plurality of pieces of first sample audio data to obtain the plurality of pieces of floating-point sample audio data.

Optionally, the encoding unit is specifically configured to perform, by using a single instruction multiple data (SIMD) algorithm, audio characteristic parameter extraction in the parallel manner on a preset parallel quantity of pieces of floating-point sample audio data to obtain a plurality of audio characteristic parameters; and perform quantization and coding on, and remove redundant information from, the plurality of audio characteristic parameters to obtain the plurality of pieces of target encoded audio data.

Optionally, the synchronization module 42 is specifically configured to obtain sampling information of each target encoded audio data, encapsulating the preset quantity of pieces of target encoded audio data and the corresponding sampling information into one audio frame, to obtain the plurality of target audio frames; and synchronize the plurality of target audio frames to all communication-capable audio playback devices via a local area network.

Optionally, the apparatus further includes: a monitoring module, configured to monitor a playback state of the target audio playback device based on playback information feedback from the target audio playback device to obtain a monitoring result; a synchronization module, configured to determine an audio frame synchronization strategy for the target audio playback device based on the monitoring result.

Optionally, the synchronization module is specifically configured to send the audio switching playback command to a sub-optimal playback device when the monitoring result indicate that the target audio playback device is incapable of responding; where the sub-optimal playback device is the candidate audio playback device with a playback suitability score second only to that of the target audio playback device.

Figure 5:
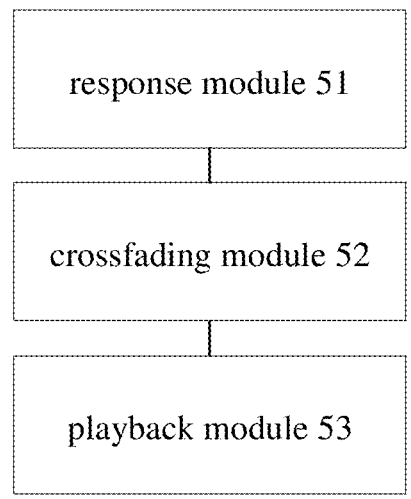
FIG. 5 is another schematic diagram of the audio playback apparatus according to the embodiments of the present disclosure.

Corresponding to the above method embodiments, referring to FIG. 5, which is a schematic diagram of an audio playback apparatus. The audio playback apparatus is applied to an audio playback device and includes: a response module 51, configured to, in response to an audio switching playback command, determine a first audio segment and a second audio segment based on an audio switching position indicated by the audio switching playback command; where the first audio segment includes a plurality of audio frames within a preset duration before the audio switching position, and the second audio segment includes a plurality of audio frames within the preset duration after the audio switching position; a crossfading module 52, configured to perform crossfading on the second audio segment according to a playback parameter of the first audio segment in the original audio playback device to obtain a target audio segment; and a playback module 53, configured to play the target audio segment.

For the audio playback apparatus, the audio playback device, in response to the audio switching playback command, performs crossfading playback on the next audio segment according to the playback attributes of the previous audio segment. This ensures smooth volume transition without clipping distortion, effectively smoothing out abrupt changes and differences during audio switching, thereby providing a more natural and coherent auditory experience.

Optionally, the crossfading module 52 is specifically configured to perform crossfading coefficient calculation, based on the playback parameter of the first audio segment in the original audio playback device, on the plurality of audio frames in the first audio segment and the second audio segment using a fade-in and fade-out window function, to obtain a target crossfading coefficient for each audio frame in the first and second audio segments; and perform weighted superimposing on the first audio segment and the second audio segment according to the target crossfading coefficient for each audio frame in the first and second audio segments, to obtain the target audio segment.

The embodiments of the present disclosure further provide an electronic device, including a processor and a memory; where the memory has stored thereon instructions executable by the processor, and the instructions, when executed by the processor, cause the processor to perform the above-mentioned audio playback method. The electronic device may be a server or a terminal device.

Figure 6:
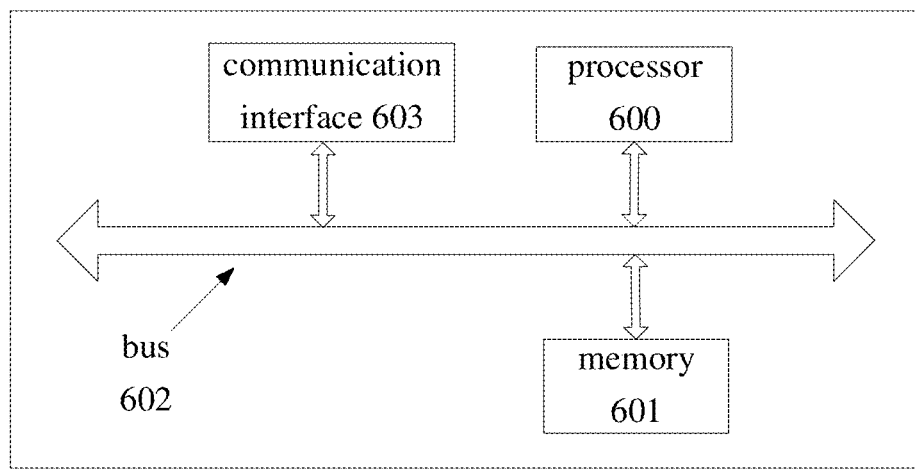
FIG. 6 is a schematic diagram of an electronic device according to the embodiments of the present disclosure.

Referring to FIG. 6, the electronic device includes a processor 600 and a memory 601, the memory 601 has stored thereon machine-executable instructions executable by the processor 600, and the processor 600 executes the machine-executable instructions to implement the above-mentioned audio playback method.

Furthermore, the electronic device in FIG. 6 further includes a bus 602 and a communication interface 603. The processor 600, the communication interface 603, and the memory 601 are connected through the bus 602.

The memory 601 may include a high-speed random access memory (RAM) or a non-volatile memory, such as at least one disk memory. A communication connection between the system network element and at least one another network element is achieved through at least one communication interface 603 (which may be wired or wireless) and may use the Internet, a Wide Area Network (WAN), a Local Area Network (LAN), a Metropolitan Area Network (MAN), etc. The bus 602 may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, and etc. For convenience of representation, only one bidirectional arrow is used in FIG. 6 to indicate the bus, but it does not mean that there is only one bus or one type of bus.

The processor 600 may be an integrated circuit chip with signal processing capabilities. In the implementation process, each step of the aforementioned method may be accomplished through integrated logic circuits in hardware within the processor 600 or in the form of software instructions. The processor 600 may be a general-purpose processor, including a Central Processing Unit (CPU), Network Processor (NP), etc. It may also be a Digital Signal Processor (DSP), an Application Specific Integrated Circuit (ASIC), a Field-Programmable Gate Array (FPGA), or any other programmable logic device, a discrete gate or a transistor logic device, a discrete hardware component. The methods, steps, and logic diagrams of the embodiments in the present disclosure may be implemented or executed. The general-purpose processor may be a microprocessor or any general processor. The steps of the method in the embodiments may be directly executed by a hardware decoding processor or by a combination of hardware and software modules in a decoding processor. The software modules may be in a well-established storage medium in the art such as a random-access memory (RAM), a flash memory, a read-only memory (ROM), a programmable read-only memory (PROM), an electrically erasable programmable read-only memory (EEPROM), or a register. The storage medium is located in the memory 601, and the processor 600 reads information from the memory 601 and to perform the steps of the methods in the aforementioned embodiments in combination with the hardware of the processor 600.

The embodiments of the present disclosure further provide a computer-readable storage medium, the computer-readable storage medium has computer-executable instructions stored thereon, and the computer-executable instructions, when called and executed by a processor, cause the processor to implement the above-mentioned audio playback method.

The embodiments of the present disclosure further provide a computer program product of the audio playback method and the audio playback apparatus, the electronic device and the storage medium, the computer program product includes a computer-readable storage medium having program code stored there. Instructions included in the program code may be used to implement the methods in the method embodiments. For specific implementation details, please refer to those method embodiments, which are not repeated herein.

Those skilled in the art may clearly understand that, for the sake of convenience and brevity of description, the specific working process of the aforementioned systems and apparatus can refer to the corresponding processes in the method embodiments, which are not repeated herein.

Unless otherwise specified, such words as "install", "connect" and "connection" should be construed in a broad sense. For example, it may be a fixed connection, a detachable connection or an integral connection; it may be a mechanic connection or an electrical connection; it may be a direct connection or an indirect connection via an intermediate medium, or an interior connection of two elements.

A person of ordinary skill in the art may derive the specific meaning of the term in the present disclosure according to the specific situation.

If the function is implemented in the form of software functional units and sold or used as an independent product, it may be stored in a computer readable storage medium. Based on this understanding, essence of the technical solutions of the present disclosure, or the part contributing to the prior art, or part of the technical solutions, may be embodied in the form of a software product. The computer software product is stored in a storage medium, and includes a number of instructions to enable a computer device (which may be a personal computer, a server, or a network device, etc.) to perform all or part of the steps of method described in the various embodiments of the present disclosure. The storage medium includes a USB flash disk, a mobile hard disk, a read-only memory (Read-Only Memory, ROM), a random access memory (Random Access Memory, RAM), a magnetic disk, an optical disk, or other medium which can store program code.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

It should be appreciated that the above embodiments are only specific embodiments of the present disclosure, used to illustrate the technical solutions of the present disclosure, but shall not be construed as limiting the present disclosure. The scope of the present disclosure is by no means limited thereto. As can be appreciated by a person skilled in the art, although the present disclosure has been described in detail with reference to the foregoing embodiments, any modifications or variations of the technical solutions in the aforementioned embodiments, or equivalent replacements of part of the technical features within the scope of the disclosed technology, may still be made by those skilled in the art. These modifications, variations, or replacements do not make the essence of the corresponding technical solutions depart from the spirit and scope of the technical solutions of the embodiments of the present disclosure and should be encompassed within the scope of the present disclosure. Therefore, the scope of the present disclosure shall be subject to the scope defined by the appended claims.

What is claimed is:

1. An audio playback method, comprising:
   obtaining original audio data to be played in real time; wherein the original audio data is a segment of an audio object currently being played on an original audio playback device;
   performing floating-point sample sampling on the original audio data to obtain a plurality of pieces of floating-point sample audio data;
   performing, by using a single instruction multiple data (SIMD) algorithm, transformation domain analysis in a parallel manner on the plurality of pieces of floating-point sample audio data according to a preset parallel quantity, to obtain a plurality of audio characteristic parameters; wherein each audio characteristic parameter is a Mel-Frequency Cepstral Coefficient (MFCC);

performing, by using an Algebraic Codebook Excited Linear Prediction (ACELP) encoding algorithm, quantization and coding on, and removing redundant information from, the plurality of audio characteristic parameters, to obtain a plurality of pieces of target encoded audio data;

performing encapsulation on the plurality of pieces of target encoded audio data to obtain a plurality of target audio frames, and synchronizing the plurality of target audio frames to all communication-capable audio playback devices; wherein each target audio frame comprises a sample rate, a bit depth and a quantity of channels;

in response to a switching command for switching an audio playback device, determining at least one candidate audio playback device indicated by the switching command; wherein the switching command is used to indicate an audio switching position;

performing optimal playback device recognition on the at least one candidate audio playback device based on a signal-to-noise ratio (SNR), an input sensitivity, a conversion rate, channel crosstalk, a common-mode rejection ratio (CMRR), a damping factor, volume, a silent mode switch, a switching priority and a sound effect mode of each candidate audio playback device, and ambient noise level of an environment where each candidate audio playback device is located, whether a talker is located in a specific space where any candidate audio playback device is located, and whether the environment where the candidate audio playback device is located is in a silent mode, to obtain a target audio playback device;

sending an audio switching playback command to the target audio playback device, to enable the target audio playback device to start audio playback based on the target encoded audio data from the audio switching position;

receiving playback information fed back by the target audio playback device in real time, analyzing and monitoring a playback state of the target audio playback device in real time according to the playback information, to obtain a monitoring result; wherein the playback state comprises playback progress, a buffering amount, CPU load of the target audio playback device; and determining, based on the monitoring result, whether to adjust an audio frame synchronization strategy for the target audio playback device, and a specific audio frame synchronization strategy to be adjusted.

2. The method according to claim 1, wherein determining at least one candidate audio playback device indicated by the switching command in response to the switching command for switching the audio playback device comprises:

determining whether the switching command is a voice-type switching command in response to the switching command for switching the audio playback device;

performing semantic recognition on a voice content of the switching command in response to that the switching command is the voice-type switching command, to obtain the at least one candidate audio playback device indicated by the switching command; and parsing the switching command for information about the audio playback device in response to that the switching command is a non-voice-type switching command, to obtain the at least one candidate audio playback device indicated by the switching command.

3. The method according to claim 1, wherein performing optimal playback device recognition on the at least one candidate audio playback device to obtain the target audio playback device comprises:

performing playback suitability scoring on each candidate audio playback device based on an environmental parameter of the environment where each candidate audio playback device is located and a device attribute parameter of each candidate audio playback device, to obtain a playback suitability score corresponding to each candidate audio playback device; and determining a candidate audio playback device with a highest playback suitability score as the target audio playback device.

4. The method according to claim 3, wherein the environmental parameter comprises ambient noise level, and the device attribute parameter comprises predicted network transmission delay duration, a device performance parameter and a device preference parameter;

performing playback suitability scoring on each candidate audio playback device based on the environmental parameter of the environment where each candidate audio playback device is located and the device attribute parameter of each candidate audio playback device to obtain the playback suitability score corresponding to each candidate audio playback device comprises:

evaluating the ambient noise level for each candidate audio playback device by using a predefined ambient noise evaluation model, to obtain the environmental parameter of the environment where each candidate audio playback device is located;

obtaining a real-time network transmission parameter for each candidate audio playback device, and predicting, based on the real-time network transmission parameter, network transmission delay duration for each candidate audio playback device to obtain the predicted network transmission delay duration corresponding to each candidate audio playback device; and obtaining the device performance parameter and the device preference parameter for each candidate audio playback device, and calculating, by using a predefined playback suitability scoring function, the playback suitability score for each candidate audio playback device based on the environmental parameter, the predicted network transmission delay duration, the device performance parameter and the device preference parameter, to obtain the playback suitability score corresponding to each candidate audio playback device.

5. The method according to claim 1, wherein performing floating-point sample sampling on the original audio data to obtain the plurality of pieces of floating-point sample audio data comprises:

sampling the original audio data at a preset sampling rate to obtain a plurality of pieces of integer sample audio data;

converting the plurality of pieces of integer sample audio data into floating-point numbers, to obtain a plurality of pieces of first sample audio data; and normalizing the plurality of pieces of first sample audio data to obtain the plurality of pieces of floating-point sample audio data.

6. The method according to claim 1, wherein performing encapsulation on the plurality of pieces of target encoded audio data to obtain the plurality of target audio frames and synchronizing the plurality of target audio frames to all communication-capable audio playback devices comprises:

obtaining sampling information of each target encoded audio data, encapsulating a preset quantity of pieces of target encoded audio data and corresponding sampling information into one audio frame, to obtain the plurality of target audio frames; and synchronizing the plurality of target audio frames to all communication-capable audio playback devices via a local area network.

7. The method according to claim 1, wherein determining whether to adjust the audio frame synchronization strategy for the target audio playback device and the specific audio frame synchronization strategy to be adjusted based on the monitoring result comprises:

sending the audio switching playback command to a sub-optimal playback device when the monitoring result indicate that the target audio playback device is incapable of responding; wherein the sub-optimal playback device is the candidate audio playback device with a playback suitability score second only to that of the target audio playback device.

8. An electronic device, comprising: a processor and a memory; wherein the memory has stored thereon machine-executable instructions that is capable of being executed by the processor, and the machine-executable instructions, when executed by the processor, cause the processor to perform the audio playback method according to claim 1.

9. A non-transitory computer-readable storage medium, wherein the computer-readable storage medium has computer-executable instructions stored thereon, and the computer-executable instructions, when called and executed by a processor, cause the processor to implement the audio playback method according to claim 1.

10. An audio playback apparatus, comprising:

an encoding module, configured to obtain original audio data to be played in real time, the original audio data being a segment of an audio object currently being played on an original audio playback device; perform floating-point sample sampling on the original audio data to obtain a plurality of pieces of floating-point sample audio data; perform, by using a single instruction multiple data (SIMD) algorithm, transformation domain analysis in the parallel manner on the plurality of pieces of floating-point sample audio data according to a preset parallel quantity, to obtain a plurality of audio characteristic parameters; wherein each audio characteristic parameter is a Mel-Frequency Cepstral Coefficient (MFCC); and perform, by using an Algebraic Codebook Excited Linear Prediction (ACELP) encoding algorithm, quantization and coding on, and remove redundant information from, the plurality of audio characteristic parameters, to obtain a plurality of pieces of target encoded audio data;

a synchronization module, configured to perform encapsulation on the plurality of pieces of target encoded audio data to obtain a plurality of target audio frames, and synchronize the plurality of target audio frames to all communication-capable audio playback devices; wherein each target audio frame comprises a sample rate, a bit depth and a quantity of channels;

a preliminary selection module, configured to, in response to a switching command for switching an audio playback device, determine at least one candidate audio playback device indicated by the switching command; wherein the switching command is used to indicate an audio switching position;

an optimal selection module, configured to perform optimal playback device recognition on the at least one candidate audio playback device based on a signal-to-noise ratio (SNR), an input sensitivity, a conversion rate, channel crosstalk, a common-mode rejection ratio (CMRR), a damping factor, volume, a silent mode switch, a switching priority and a sound effect mode of each candidate audio playback device, and ambient noise level of an environment where each candidate audio playback device is located, whether a talker is located in a specific space where any candidate audio playback device is located, and whether the environment where the candidate audio playback device is located is in a silent mode, to obtain a target audio playback device; and an indication module, configured to send an audio switching playback command to the target audio playback device, to enable the target audio playback device to start audio playback based on the target encoded audio data from the audio switching position; receive playback information fed back by the target audio playback device in real time, analyze and monitor a playback state of the target audio playback device in real time according to the playback information, to obtain a monitoring result; wherein the playback state comprises playback progress, a buffering amount, CPU load of the target audio playback device; and determine, based on the monitoring result, whether to adjust an audio frame synchronization strategy for the target audio playback device, and a specific audio frame synchronization strategy to be adjusted.

* * * * *